UNITED STATES PATENT OFFICE.

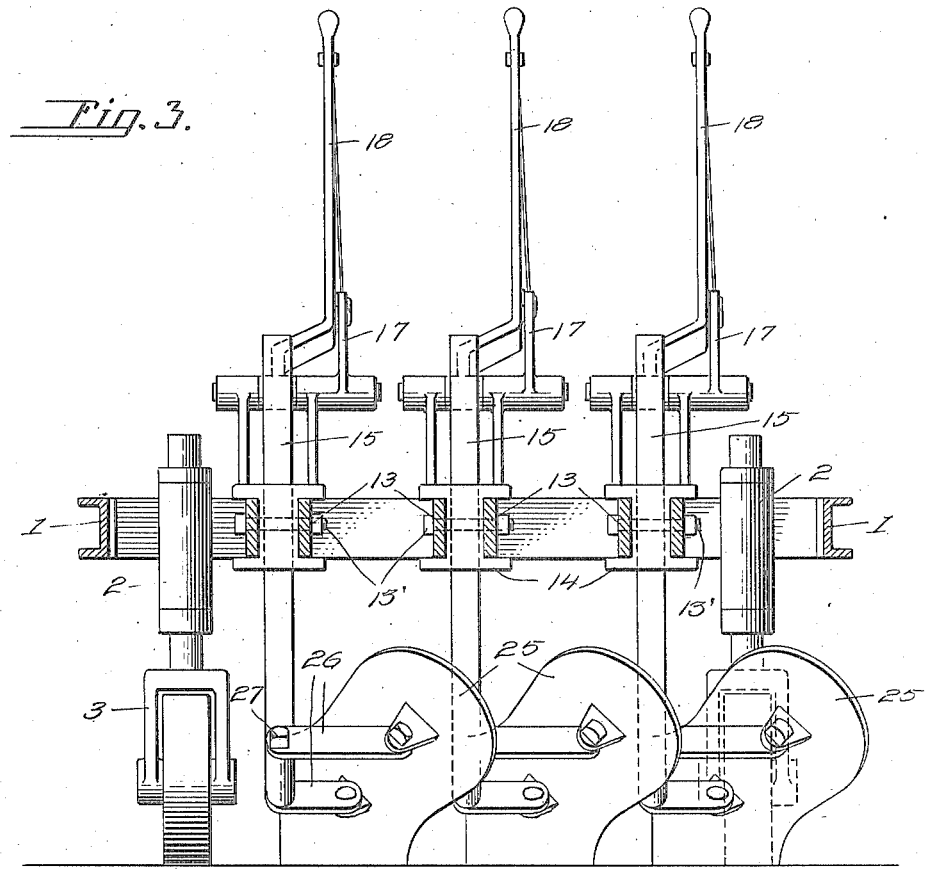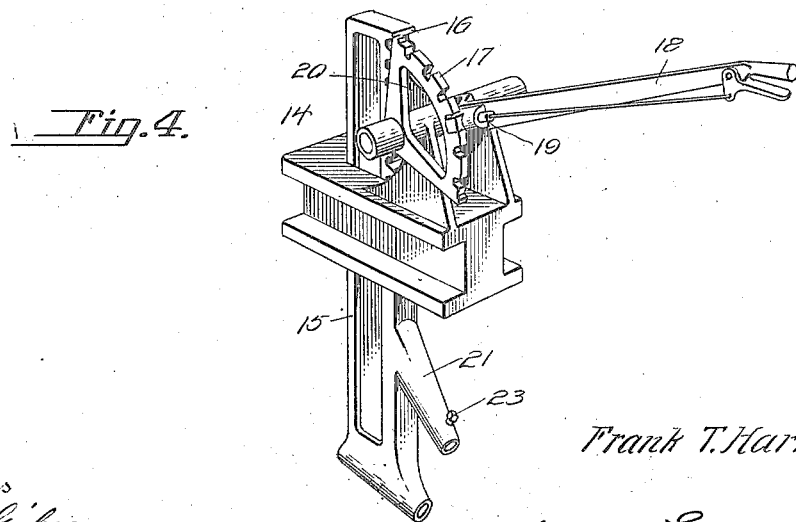

FRANK T. HARRIS, OF LANCASTER, NEW HAMPSHIRE.

PLOW.

1,294,902.     Specification of Letters Patent.   Patented Feb. 18, 1919.

Application filed March 8, 1918. Serial No. 221,243.

*To all whom it may concern:*

Be it known that I, FRANK T. HARRIS, a citizen of the United States, residing at Lancaster, in the county of Coos and State of New Hampshire, have invented new and useful Improvements in Plows, of which the following is a specification.

This invention relates to plows and it consists in the novel structure hereinafter described and claimed.

An object of the invention is to provide a plow of simple and durable structure adapted to be coupled with a tractor or other means for drawing the same and which may be easily and readily converted from a plow adapted to cast the furrow slices through the right-hand side as the plow moves over the soil into a plow which may cast the said slices to the left-hand side of the path of movement of the same. Therefore the plow may be used to advantage for reciprocating back and forth across the field and is of such structure as to eliminate the requirement for passing the plow around the field as is the usual process with plows which cannot be converted from right-hand plows to left-hand plows in a manner as above indicated.

With the above object in view the plow comprises a frame constructed preferably of channel iron and which is provided at its intermediate portion with several series of parallel spaced guides. Blocks are slidably mounted upon the guides and may be adjusted along the same. Standards are vertically and adjustably mounted in the blocks and means are provided for adjusting the said standards in the blocks. Mold boards are pivotally connected with the lower portions of the standards and adapted to be swung from one side thereof to the opposite sides thereof. Sleeves are carried at the lower portions of the standards and brackets are detachably mounted in the sleeves and carry colter wheels which are adapted to travel in advance of the mold boards and cut cisions in the soil whereby the soil is divided into furrow slices. The forward porion of the frame is supported upon caster vheels and clevis couplings are mounted at he forward part of the frame whereby the frame may be connected with suitable draft means. A shaft is journaled at the opposite end portion of the frame from that end at which the caster wheels are mounted and the said shaft carries laterally disposed arms which in turn support an axle. A series of rollers is journaled upon the axle and the said rollers are independent of each other consequently some of the rollers may turn in a forward direction whereby other of the rollers may turn in a rearward direction thus facilitating the turning of the plow at the ends of the rows or furrows.

In the accompanying drawings:—

Fig. 3 is a transverse sectional view of the same cut on the line 3—3 of Fig. 2.

Fig. 4 is a perspective view of a block and attached part used upon the plow.

Figure 1:
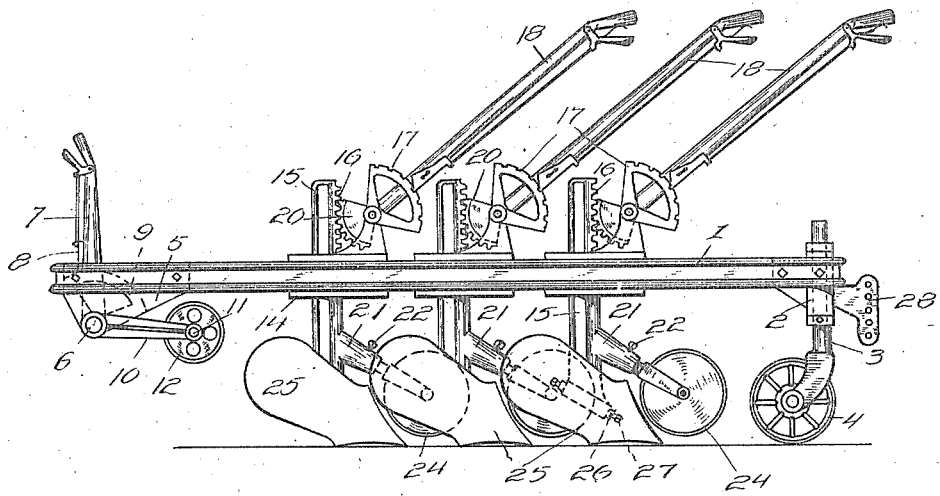
Figure 1 is a side elevation of the plow.
Figure 2:
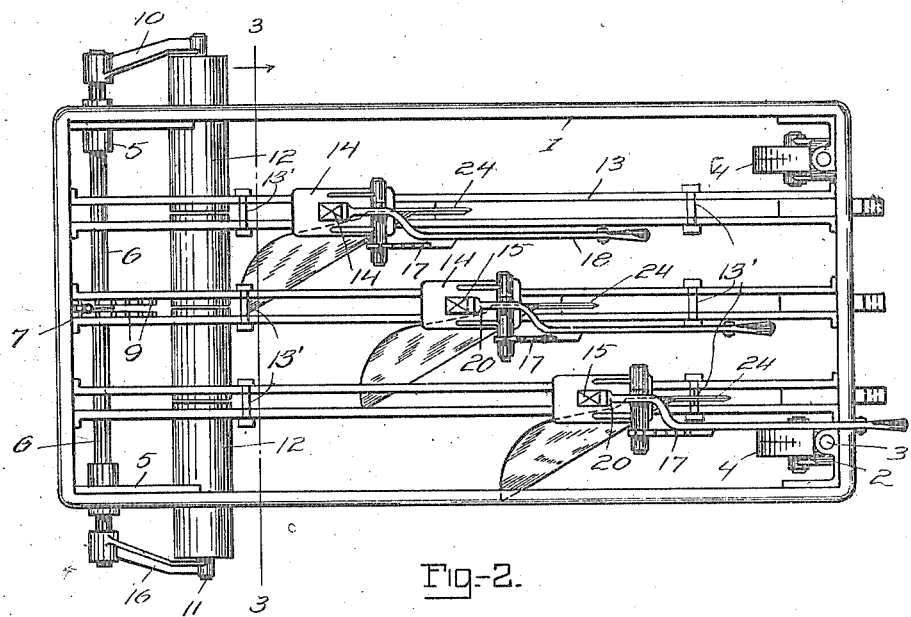
Fig. 2 is a top plan view of the same.

As illustrated in the accompanying drawings the plow comprises a rectangular frame 1 preferably of channel iron and which is provided at the corners and at its forward ends with bearings 2 and caster frames 3. Wheels 4 are journaled in the frame 3 and adapted to travel upon the surface of the soil.

Bearings 5 are mounted at the corner portions of the rear part of the frame 1 and a shaft 6 is journaled in the said bearings. A lever 7 is fixed to the shaft 6 and carries a pawl 8 which may engage the teeth of dentate segments 9 which are fixed with relation to the frame 1. Laterally disposed arms 10 are fixed to the shaft 6 and the said arms carry an axle 11. Rollers 12 are journaled upon the axle 11 and the outer or terminal rollers 12 are somewhat longer than the intermediate rollers 12. These rollers are journaled independently of each other consequently some of the rollers may turn in one direction and others may turn in an opposite direction upon the axle 11 when the plow is being turned around and consequently the plow may be turned in a limited space. Guide bars 13 are mounted upon the frame 1 and extend longitudinally thereof. The said bars 13 are arranged in pairs and the members of the pairs are spaced from each other and parallel to each other. Blocks 14 are slidably mounted upon the pairs of bars 13 and may be secured at any adjusted position thereon. Standards 15 are vertically adjustable in the blocks 14 and the said standards carry at their upper and forward portions teeth 16 as best shown in Fig. 1 of the drawing. Bolts 13' pass transversely through the bars 13 beyond the ends of the blocks 14, and when tightened will serve to draw the bars 13 toward each other whereby the blocks 14 are held at adjusted positions between the said bars. Notched segments 17 are mounted upon the blocks 14 and levers 18 are pivoted upon the said blocks. The said levers 18 carry pawls 19 which are adapted to engage in the notches of the segments 17 whereby the levers are held at adjusted positions with relation to the said segments. Dentate segments 20 are formed upon the levers 18 and the teeth of the segments 20 mesh with the teeth 16 of the standards 15. Each standard 15 is provided at its lower forward portion with a sleeve 21 which receives the shank of a yoke 22. The yoke is secured in the sleeve 21 by means of a set-screw 23 which is threaded through the side of the sleeve 21 and engages the shank of the yoke. Each yoke 22 carries a colter wheel 24.

Mold boards 25 are carried at the lower portions of the standards 15. Each mold board is provided at its rear sides with spaced lugs 26 which are positioned at the forward and rear edges respectively of the standards to which the mold board is attached and bolts 27 pass through the said lugs and engage the standards whereby the mold board may be secured at an adjusted position with relation to the standards. The forward or cutting edge of each mold board is positioned directly behind the rear edge of the colter wheel 24 connected with the same standard.

By loosening the bolt 27 the lugs 26 and the mold board 25 to which the said lugs are attached may be swung from one side of the standards 15 to the opposite side thereof and consequently the mold board may be shifted from a position at the right hand side of the standard to a position at the left of the standard and therefore the plow may be readily converted from a right-hand plow to a left-hand plow to facilitate the turning of the furrow slices as the plow is reciprocated back and forth across a field. Clevis supports 28 are attached to the forward portion of the frame 1 preferably at points between the pairs of bars 13 and the said supports 28 may be connected with suitable draft appliances for the purpose of drawing the plow over the surface of the ground. The outer portions of the terminal rollers 12 extend beyond the outer sides of the mold boards 25 consequently the outer end portions of the outer rollers 12 may travel upon the surface of the unbroken ground and upon the surface of the furrow slices which have been turned and therefore the rear portion of the frame 1 may be maintained at a proper distance from the surface of the soil. The wheels 4 are located within the side portions of the frame 1 and are adapted to travel upon the unbroken ground, therefore the said wheels 4 may serve as gages for maintaining the mold boards at proper depth in the soil and the wheels also serve as means for supporting the forward portion of the frame 1. The boards 25 may be swung about the links 26 when the devices which secure them to the links are loosened. When the said devices are tightened the boards are held at fixed positions with relation to the links.

From the foregoing description taken in conjunction with the accompanying drawings it is apparent that the plow may be readily turned at the end of a row or furrow when the rollers 12 are in contact with the surface of the ground for the reason that some of the said rollers may turn in one direction while the other rollers are turning in an opposite direction and consequently the said rollers serve as a pivot point upon which the frame of the plow may turn. Also the plow may be used to advantage as a right-hand plow and a left-hand plow and thereby avoid the necessity of moving the plow around a field in order to cast the furrow slices in the same direction inasmuch as the plow may be reciprocated back and forth and by turning the mold board all of the furrow slices will be cast in the same direction.

Having described the invention what is claimed is:—

A plow comprising a frame, guide bars mounted upon the frame and extending longitudinally thereof, said bars being arranged in spaced pairs, the members of the pairs being parallel with each other, blocks slidably mounted between the pairs of bars, bolts passing transversely through the bars at points beyond the ends of the blocks and adapted to draw the bars toward each other to clamp the blocks, standards vertically adjustable in the blocks, mold boards mounted at the lower portions of the standards and means for supporting the frame.

In testimony whereof I affix my signature.

FRANK T. HARRIS.